US011269917B1

(12) United States Patent
Srikantan et al.

(10) Patent No.: US 11,269,917 B1
(45) Date of Patent: Mar. 8, 2022

(54) SECURE CLUSTER PAIRING FOR BUSINESS CONTINUITY AND DISASTER RECOVERY

(71) Applicant: Cisco Technology, Inc., San Jose, CA (US)

(72) Inventors: Geetha Srikantan, Palo Alto, CA (US); Sudarsana Rao Piduri, Campbell, CA (US); Siddharth Sambamoorthy, Fremont, CA (US); Ashish Hanwadikar, San Jose, CA (US); Suresh Dussa, San Jose, CA (US); Aaron Anton Kapacinskas, Carnation, WA (US); Mohan Kumar, San Jose, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 159 days.

(21) Appl. No.: 16/132,982

(22) Filed: Sep. 17, 2018

Related U.S. Application Data

(60) Provisional application No. 62/697,648, filed on Jul. 13, 2018.

(51) Int. Cl.
*G06F 16/27* (2019.01)
*G06F 11/14* (2006.01)
(Continued)

(52) U.S. Cl.
CPC .......... *G06F 16/27* (2019.01); *G06F 9/45558* (2013.01); *G06F 11/1464* (2013.01);
(Continued)

(58) Field of Classification Search
CPC .. G06F 11/1464; G06F 16/27; G06F 11/1484; G06F 11/1662; H04L 41/0893; H04L 45/02; H04L 63/0263
(Continued)

(56) References Cited

U.S. PATENT DOCUMENTS 6,993,034 B1 * 1/2006 Block ............... H04L 29/12783
370/390
7,289,994 B2 * 10/2007 Nixon ................ G05B 19/4185
(Continued)

OTHER PUBLICATIONS

Anonymous, Enterprise Hybrid Cloud 4.1.2, Concepts and Architecture, Dell EMC, Sep. 2017, pp. 1-136.
(Continued)

*Primary Examiner* — Ashish Thomas
*Assistant Examiner* — Nargis Sultana
(74) *Attorney, Agent, or Firm* — Edell, Shapiro & Finnan, LLC

(57) ABSTRACT

Techniques are disclosed for providing backup protection. A first subnet is established for replication in a first cluster that includes a plurality of host devices. Each of the host devices includes a respective controller virtual machine, which together form a virtual local area network for replication. Each of the controller virtual machines is assigned an Ethernet interface. A replication Internet Protocol address is assigned to each of the Ethernet interfaces of the controller virtual machines. Route tables and firewall rules of the controller virtual machines are modified to allow communications between nodes of the first subnet. The first subnet is configured with information related to a second subnet for replication in a second cluster. A dedicated communication channel is generated for replication between the first cluster and the second cluster based on the configuring.

18 Claims, 8 Drawing Sheets

(51) Int. Cl.
  *G06F 11/16* (2006.01)
  *H04L 41/0893* (2022.01)
  *H04L 67/1097* (2022.01)
  *H04L 29/06* (2006.01)
  *H04L 45/02* (2022.01)
  *G06F 9/455* (2018.01)
  *H04L 69/40* (2022.01)
(52) U.S. Cl.
  CPC ...... *G06F 11/1484* (2013.01); *G06F 11/1662* (2013.01); *H04L 41/0893* (2013.01); *H04L 45/02* (2013.01); *H04L 63/0263* (2013.01); *H04L 63/0272* (2013.01); *H04L 67/1097* (2013.01); *H04L 69/40* (2013.01); *G06F 2009/45595* (2013.01); *G06F 2201/815* (2013.01)
(58) Field of Classification Search
  USPC .......................................................... 707/610
  See application file for complete search history.

(56) References Cited

U.S. PATENT DOCUMENTS

| | | | | |
|---|---|---|---|---|
| 7,523,097 | B1* | 4/2009 | Wilson | H04L 41/0856 |
| 8,621,569 | B1* | 12/2013 | Ewing | G06F 12/084 |
| | | | | 726/3 |
| 8,972,405 | B1* | 3/2015 | Chaulk | G06F 16/182 |
| | | | | 707/737 |
| 9,032,095 | B1* | 5/2015 | Traina | H04L 41/0813 |
| | | | | 709/242 |
| 9,330,156 | B2* | 5/2016 | Satapathy | H04L 67/1097 |
| 9,348,627 | B1* | 5/2016 | Palekar | G06F 9/45558 |
| 9,448,927 | B1* | 9/2016 | Agarwala | G06F 12/0811 |
| 9,529,804 | B1* | 12/2016 | Muddu | G06F 16/00 |
| 9,720,619 | B1 | 8/2017 | Shah et al. | |
| 9,928,148 | B2* | 3/2018 | Kadayam | G06F 11/2094 |
| 10,083,057 | B1* | 9/2018 | Currie | G06F 9/45558 |
| 10,296,242 | B2* | 5/2019 | Piduri | G06F 3/065 |
| 10,365,982 | B1* | 7/2019 | Brooks | G06F 3/0688 |
| 10,664,363 | B2* | 5/2020 | Liu | G06F 11/1088 |
| 2008/0247403 | A1* | 10/2008 | Seo | H04L 12/2832 |
| | | | | 370/401 |
| 2008/0250210 | A1* | 10/2008 | Ash | G06F 11/2033 |
| | | | | 711/141 |
| 2009/0089300 | A1* | 4/2009 | Vicente | H04L 41/0893 |
| 2012/0233118 | A1* | 9/2012 | Holt | G06F 16/2219 |
| | | | | 707/620 |
| 2013/0007506 | A1* | 1/2013 | Jain | G06F 11/1484 |
| | | | | 714/4.12 |
| 2013/0182552 | A1* | 7/2013 | Hall | H04L 12/6418 |
| | | | | 370/216 |
| 2015/0112933 | A1* | 4/2015 | Satapathy | H04L 41/5019 |
| | | | | 707/634 |
| 2015/0169414 | A1* | 6/2015 | Lalsangi | G06F 11/2092 |
| | | | | 707/610 |
| 2015/0172111 | A1* | 6/2015 | Lalsangi | H04L 67/42 |
| | | | | 709/220 |
| 2016/0048408 | A1* | 2/2016 | Madhu | G06F 11/2023 |
| | | | | 718/1 |
| 2016/0057009 | A1* | 2/2016 | Kadayam | H04L 41/0873 |
| | | | | 709/221 |
| 2017/0019370 | A1* | 1/2017 | Ravinoothala | H04L 61/103 |
| 2017/0235764 | A1* | 8/2017 | Sharpe | G06F 3/0647 |
| | | | | 707/827 |
| 2017/0286236 | A1* | 10/2017 | Protasov | G06F 16/184 |
| 2017/0302572 | A1* | 10/2017 | Izhak-Ratzin | H04L 41/0893 |
| 2017/0317887 | A1* | 11/2017 | Dwaraki | H04L 45/38 |
| 2018/0300203 | A1* | 10/2018 | Kathpal | G06F 16/278 |
| 2019/0123962 | A1* | 4/2019 | Guo | H04L 41/20 |
| 2019/0243702 | A1* | 8/2019 | Shilane | G06F 16/275 |
| 2019/0340091 | A1* | 11/2019 | Chandrasekaran | G06F 9/547 |
| 2020/0004570 | A1* | 1/2020 | Glade | G06F 9/45558 |
| 2020/0019468 | A1* | 1/2020 | Chinnam | H04L 61/2007 |

OTHER PUBLICATIONS

NetApp, Inc., "Cluster and SVM Peering Express Guide", 215-11182_G0, https://library.netapp.com/ecm/ecm_download_file/ECMLP2496233, Aug. 2018, 19 pages.

NetApp, Inc., "Cluster peer intercluster networking requirements", Part No. 215-07956_A0, https://library.netapp.com/ecmdocs/ECMP1196798/html/GUID-9987850F-C3C7-4A71-B788-1F157ACD1B16.html, May 2013, 1 page.

NetApp, Inc., "Cluster and SVM peering workflow", ONTAP 9 Documentation Center, Part No. 215-11182_G0, http://docs.netapp.com/ontap-9/index.jsp?topic=%2Fcom.netapp.doc.exp-clus-peer%2FGUID-5954A646-EFA6-423C-BDAD-99E5B9EB28E5.html&cp=6_1_2, Aug. 2018, 2 pages.

* cited by examiner

SECURE CLUSTER PAIRING FOR BUSINESS CONTINUITY AND DISASTER RECOVERY

PRIORITY CLAIM

This application claims priority to U.S. Provisional Patent Application No. 62/697,648, filed Jul. 13, 2018, the entirety of which is incorporated herein by reference.

TECHNICAL FIELD

The present disclosure relates to solutions for business continuity and disaster recovery.

BACKGROUND

Business continuity and disaster recovery are important capabilities in network computation environments. Business continuity involves replication of data and metadata across clusters. In many instances, this replication communication traverses across the Internet, crossing data center boundaries. In order to support these capabilities, a cluster and its virtual machines at one site are protected through replication on a different cluster at a different site.

Each of these clusters is typically located within a data-center at the site. These clusters and data-centers are logically distinct and very often are physically distinct. One common use case is to have geographically separate sites to improve protection.

A basic requirement for business continuity is to have a communication channel between the clusters, to support the protection and replication of virtual machines, as well as other disaster recovery workflows. In order to make the best use of network resources, all nodes of a cluster at one site need to communicate with all nodes at the other site. That is, a many-to-many topology is needed, with respect to connectivity.

DESCRIPTION OF EXAMPLE EMBODIMENTS

Overview

Presented herein are techniques to securely pair nodes in one computer cluster to nodes in another computer cluster to provide business continuity and disaster recovery. A secure mechanism for the creation of a communication channel is provided hereafter. This communication channel, once created, can be configurable as a secure channel by system administrators, using mechanisms such as a virtual private network (VPN).

Techniques disclosed herein provide backup protection for computer network systems. A first subnet is established for replication in a first cluster that includes a plurality of host devices. Each of the host devices includes a respective controller virtual machine, which together form a virtual local area network for replication. Each of the controller virtual machines is assigned an Ethernet interface. A replication Internet Protocol (IP) address is assigned to each of the Ethernet interfaces of the controller virtual machines. Route tables and firewall rules of the controller virtual machines are modified to allow communications between nodes of the first subnet. The first subnet is configured with information related to a second subnet for replication in a second cluster. A dedicated communication channel is generated for replication between the first cluster and the second cluster based on the configuring.

DETAILED DESCRIPTION

For security, a storage network within each cluster is non-routable to an external network for various reasons hence a new communication channel for business continuity is introduced. A new channel is isolated such that (a) replication traffic minimizes its effect on primary input/output (I/O) traffic within the cluster; (b) a noisy neighbor in the data center network has limited impact on inter-cluster traffic; (c) the channel provides a mechanism to set properties of the channel, such as quality of service (QoS), bandwidth, security et al.; and (d) properties of the channel are modifiable without affecting primary data I/O within each cluster, nor affecting management/control traffic within the cluster.

Techniques provided herein assume no stretch virtual local area network (VLAN) capability is available between clusters. In one embodiment, creation of the channel is performed as non-disruptive as possible such that primary data/I/O traffic may not be impacted thereby avoiding reboot of hosts, such that controller nodes provision resources during install/upgrade, and such that resources are not utilized (have almost zero impact on cluster functionality/performance) when not in use.

This solution provides a secure mechanism for the creation of a channel. Example attributes of the secure mechanism include avoiding having to perform authentication and certificate management each time replication happens, avoiding managing certificates such as validation, expiry/revocation infrastructure/protocol, and avoiding having to introduce another authentication mechanism.

Figure 1:
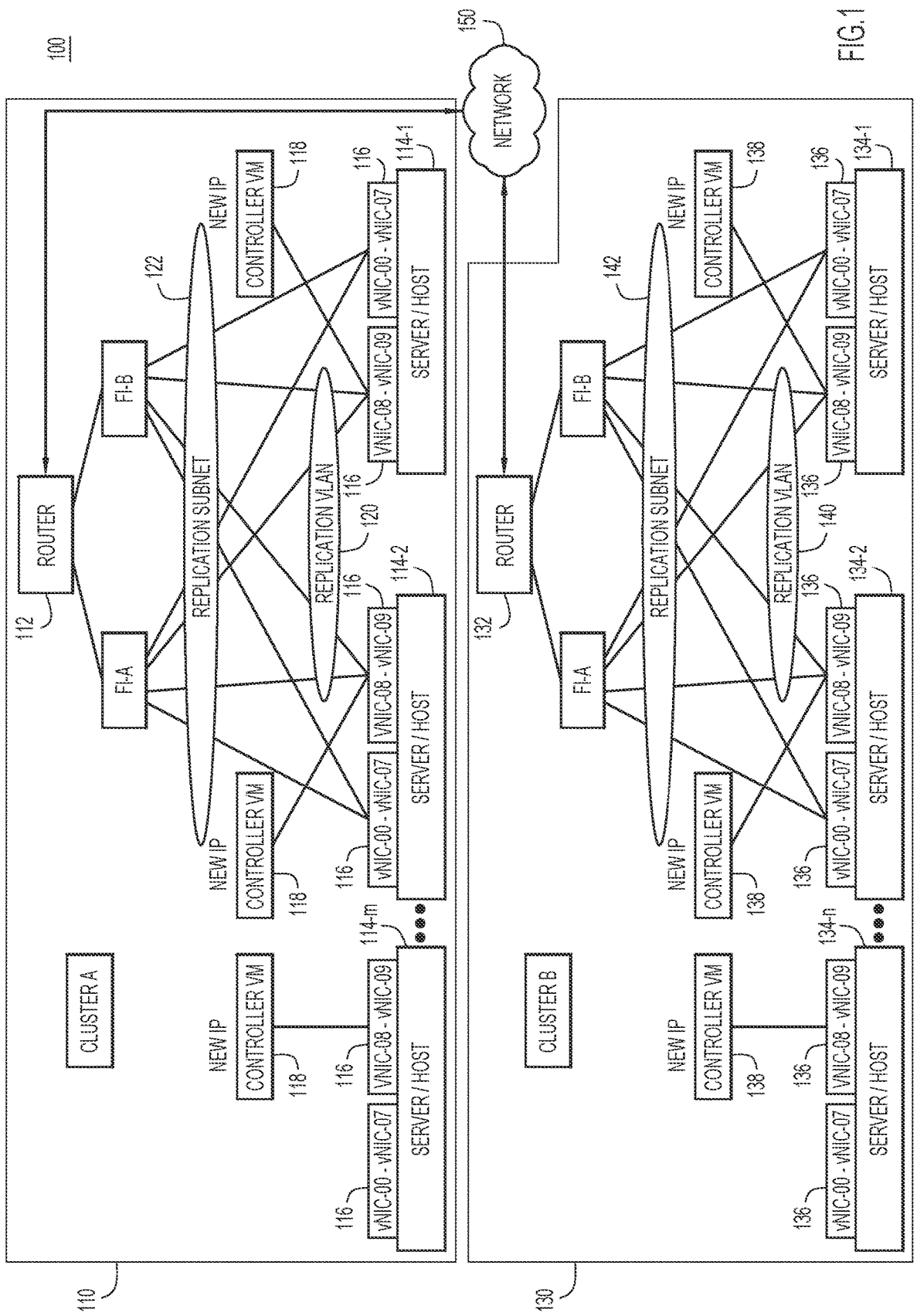
FIG. 1 is a block diagram of a system for business continuity and disaster recovery, according to an example embodiment.

Reference is made first to FIG. 1. FIG. 1 depicts a system 100 for business continuity and disaster recovery, according to one example embodiment. The system 100 includes at least two computer clusters, Cluster A (110) and Cluster B (130). Each of the clusters 110 and 130 includes a router configured to transmit and receive data for the respective cluster. For example, Cluster A includes a router 112 while Cluster B includes a router 132.

Cluster A further includes a plurality of physical servers/hosts 114-1 to 114-$m$ ($m≥2$). Each of the servers/hosts 114-1 to 114-$m$ may host a number of virtual machines (VM) 116, which may include one or more virtual network interface controllers (vNIC). Each of the servers/hosts 114-1 to 114-$m$ includes a respective controller VM 118 for replication, which together form a VLAN 120 dedicated to pairing and replication operations. Each controller VM 118 is assigned a network interface, such as an Ethernet interface, for transmitting and receiving replication traffic. Within Cluster A, a subnet 122 for replication is established. The subnet 122 is configured to allow any node or VM in Cluster A to communicate with others nodes or VMs within Cluster A.

Similarly, Cluster B includes a plurality of physical servers/hosts 134-1 to 134-$n$ ($n≥2$). Each of the servers/hosts 134-1 to 134-$n$ may host a number of VMs 136, which may include one or more vNICs. Each of the servers/hosts 134-1 to 134-$n$ includes a respective controller VM 138 for replication and pairing operations, which together form a VLAN 140 dedicated to replication operations. Each controller VM 138 is assigned a network interface, such as an Ethernet interface, for transmitting and receiving replication traffic. Within Cluster B, a subnet 142 for replication is established. The subnet 142 is configured to allow any node or VM in Cluster B to communicate with others nodes or VMs within Cluster B.

As shown in FIG. 1, Cluster A and Cluster B are connected to each other through a network 150. For example, a node in Cluster A can send data via the router 112 of Cluster A, which forwards the data to the router 132 of Cluster B via the network 150. The router 132 in Cluster B then forwards the data to a destination node of Cluster B. The number of the servers/hosts in a cluster is not limited. In one embodiment, a number of the servers/hosts in a cluster is three or more. Any suitable number of servers/hosts may be included in each cluster.

During the cluster installation or cluster upgrade stage, network resources are pre-provisioned on each physical converged host. For example, a new port-group is created on a host for the purpose of replication. This port-group is associated with the physical interface used for the management network. Network resources are also pre-provisioned on each controller VM associated with the converged hosts. For example, a new distinct virtual Ethernet interface is pre-provisioned on each controller VM. This Ethernet interface on the controller VM is associated with this new port group on the host.

Each of the cluster sites may further include one or more fabric interconnectors (FI) that interconnect the nodes within one cluster. For example, as shown in FIG. 1, each of the cluster sites includes two FIs (FI-A and FI-B) that forms a replication subnet (subnet 122 or 142 for purpose of replication). In other embodiments, the subnet 122 or 142 may be built on a different architecture of interconnection in addition, or alternative, to an FI. To prepare for cluster pairing, network resources are provisioned by the network administrator of each site. For example, the subnet 122 or 142 in each cluster may be an IP subnet. Each of the IP subnets contains at least N+1 IPs, where N is the number of converged nodes in the cluster. This IP subnet is dedicated for replication between the clusters 110 and 130. In order to accommodate future expansion of the clusters 110 and 130, a range of IP addresses, specifically, a subnet, is used to configure the clusters 110 and 130 for disaster recovery. Each of the IP subnets is given a VLAN identifier (ID). Entity firewalls and route tables are modified to allow incoming traffic to this VLAN (120 or 140) and subnet (122 or 142) and to allow traffic from this IP subnet/VLAN to be routed to the external network. Bandwidth can also be provisioned for inter-cluster communications.

To further prepare for cluster pairing, each cluster is configured with an intra-cluster replication network, i.e., subnets 122 and 142. For example, each controller VM in the cluster is configured such that the pre-provisioned Ethernet interface is assigned a replication-specific IP address. The route tables are modified to enable connectivity between nodes within the cluster, over the new interface. The firewall rules are modified to allow incoming traffic from other nodes within the cluster over the replication subnet.

On each host, the VLAN ID is associated with the replication port group. In some embodiments, bandwidth limits can also be associated with the port group. In one embodiment, the VLAN can be configured on the fabric interconnection of each cluster. In one embodiment, a cluster-wide replication cluster IP is designated and assigned to one of the converged nodes in the cluster. A service is also initiated to ensure this replication cluster IP is highly available in the cluster.

After each cluster has been prepared for pairing as explained above, a workflow to pair the clusters 110 and 130 can be invoked. In one embodiment, this workflow employs credentials of the peer cluster, with administrative privileges. For security reasons, these credentials are not persisted on each of the clusters 110 and 130. First, an inter-cluster pairing protocol can be performed. Cluster B can be modified using Cluster A's replication network details (information for replication related to Cluster A). For example, firewall rules on each controller VM 138 on Cluster B are modified to allow incoming traffic from Cluster A's replication subnet 122 and to allow outgoing traffic to Cluster A's subnet 122 to use the replication interface. Similarly, Cluster A can be modified with Cluster B's replication network details (information for replication related to Cluster B). These replication network details may include one or more of a cluster name of the peer cluster, an identifier of the peer cluster, an identifier of a gateway of the peer subnet, or a replication cluster IP address for the peer cluster. The Cluster pairing workflow is configured to be idempotent and can be invoked again to complete the workflow, in case of any failure during the workflow. That is, the details of pairing operations are logged in a workflow inventory for each cluster. Upon success, M×N connectivity is established between the clusters, for bidirectional replication, when Cluster A has M nodes and Cluster B has N nodes. Once the cluster pairing succeeds, all future communications for disaster recovery between the clusters can use the new communication channel that is generated for replication between the Cluster A and the Cluster B.

In some embodiments, the established cluster pairing can be unpaired. A corresponding cluster unpairing workflow to teardown cluster pairing is provided herein. This operation assumes both clusters are available and relies on the inter-cluster connectivity, established during cluster pairing workflow. It is to be noted that cluster unpairing is disabled while replication network is in use for disaster recovery activities.

After successfully unpairing clusters, each cluster is in the same state as it was before the cluster pairing.

In the event of a disaster at one of the sites, e.g., Cluster A, the cluster at that site may no longer be accessible or available. For certain disaster recovery workflows to proceed, it is desired to disassociate the cluster pair created earlier. As one cluster is down, it is not possible to perform a cluster unpairing operation. Instead, a mechanism to "forget" the peer cluster is provided hereinafter. In some embodiments, a mechanism to remove the disaster recovery network on a single cluster can also be achieved. Example protocols for implementing the above mechanisms are provided hereinafter.

Fabric Interconnect Configuration

First, each host can be configured to support the new communication channel for replication. In one embodiment, an existing FI virtual network interface controller (FI vNIC) that is already associated with the host can be reused or shared to control the replication workflow. A cluster may re-use the FI vNIC associated with the host's physical NIC for management network. This has the advantage of not consuming extra resources on the FI. In another embodiment, a new vNIC on the FI can be assigned and associated with an existing physical NIC on the host. An example of this architecture is shown in FIG. 1. This architecture supports use of a distinct new FI vNIC for the replication network. This has the advantage of allowing control changes independently for the FI's management vNIC and FI's replication vNIC. It is to be understood that a subnet can be configured on an FI configuration, but can also be configured on other interconnect network infrastructure.

Replication Cluster IP

As part of setting up the replication network, an extra IP address called "replication cluster IP (ReplCIP)" is also provisioned. One of the converged nodes, e.g., the nodes that provide storage, is assigned this IP address. In some embodiments, while there may be brief periods of time when there is no node with the replication cluster IP, at most times the replication cluster IP is assigned to exactly one controller VM. The replication cluster IP is configured to be highly available. In one embodiment, the highly-available replication cluster IP can be implemented using the ZooKeeper leader election scheme.

The replication cluster IP is used for various purposes without the fear of the unreachability of the IP address because of a node failure. For example, the replication cluster IP can be used to perform one or more of discovering the cluster resources (e.g., the number of nodes in the cluster, properties of these nodes, etc.), setting up protection for one or more virtual machines, removing protection for one or more virtual machines, adding/editing/removing groups of virtual machines, managing various replication operations of a virtual machine, managing various file system operations for a file that needs to be replicated including creation, deletion and cloning, and monitoring the health of the peer cluster.

In some embodiments, the replication cluster IP is accessed by two classes of clients. First, a client local to the cluster may access the replication cluster IP. This communication is established over the replication VLAN, and is limited to the replication subnet of the cluster. Both the client and the server are in the same cluster, hence there are no security implications. Second, a client from the paired/peer cluster may access the replication cluster IP. This communication can potentially cross subnets (i.e. happens over layer 3). In order to allow such clients to connect periodically, without explicit authentication, the pairing workflow sets up firewall rules on the receiving replication subnet. These rules allow traffic from the peer's replication subnet nodes to pass through without authentication.

Distributed Cluster Configuration and Management Resources

In one embodiment, a cluster can be a distributed storage cluster and implemented on a Zookeeper framework, e.g., Apache Zookeeper. The Zookeeper framework provides distributed configuration management service to maintain and synchronize configuration across all controller VMs that compose the cluster. The Zookeeper service stores configuration that governs various aspects and functionality of the cluster in hierarchical storage points typically called nodes and also provides a way to apply this configuration change to the other VMs in the cluster by providing callback functions associated with those nodes. In one embodiment, a replication controller VM may update a first node of a cluster to store the information related to a peer subnet for replication. The replication controller VM then invokes a callback function in its own cluster such that the first node causes other nodes of the cluster to store the information related to the peer subnet for replication. The Zookeeper framework is also used as the backing for a distributed non-relational database, to store configuration details, workflow transaction details and so on (collectively "inventory"). In one embodiment, a controller VM may implement IPv4/IPv6 packet filtering that serves as a firewall and the route command to manipulate the internal routing table. The tools and services are used to make changes to the network settings of the controller VM so as to allow communications between the replication networks of the two clusters.

Example Cluster Pairing Protocol

Figure 2:
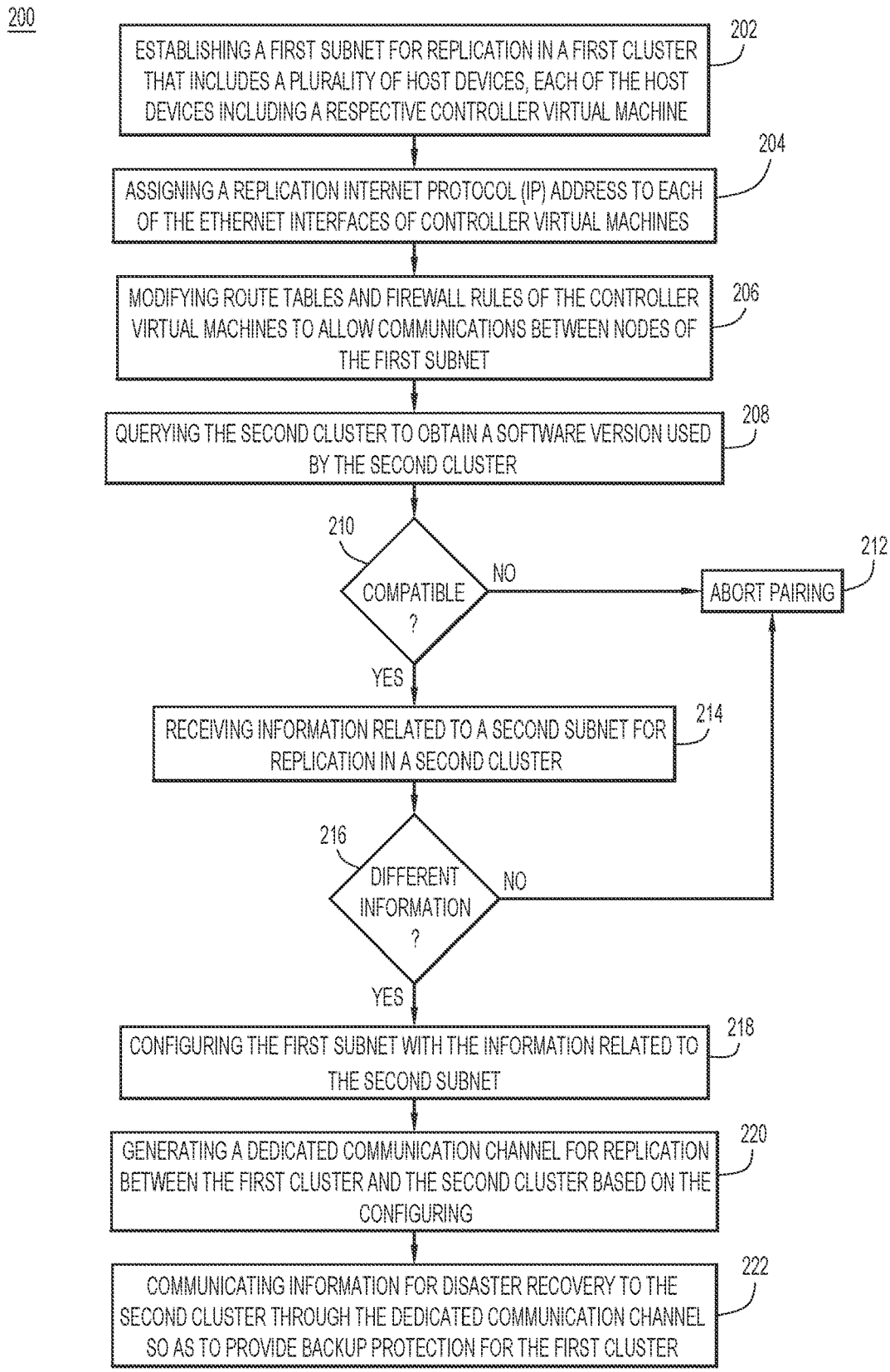
FIG. 2 is a flow chart illustrating a method for pairing nodes in a cluster with nodes in a peer cluster performed by a controller virtual machine designated to oversee replication operations, according to an example embodiment.

Reference is now made to FIG. 2. FIG. 2 is a flow chart illustrating a method 200 for pairing nodes in a cluster with nodes in a peer cluster performed by a controller VM designated for overseeing replication operations, according to an example embodiment. At 202, the controller VM establishes a first subnet for replication in a first cluster (e.g., Cluster A in FIG. 1) that includes a plurality of host devices. Each of the host devices may be a computing device that includes one or more physical processors and memories for storing data and computer-executable instructions. Detail structures of a host device will be explained hereinafter. Each of the host devices may host a number of VMs including a controller VM for replication. In some embodiments, the controller VM for replication may be an existing FI vNIC that controls an FI or a newly-formed vNIC dedicated to replication operations. The controller VMs of the hosts together form a VLAN for replication. Each of the controller virtual machines is assigned an internet interface, such as an Ethernet interface, for replication traffic. One of the controller VMs is designated to control the replication operations for the first subnet for the cluster. For example, a controller VM may be hardware, software, and a combination thereof. In one embodiment, a controller VM may be formed by one or more physical processors executing software instructions for pairing and replication operations.

At 204, the designated controller VM assigns a replication IP address to each of the Ethernet interfaces of the controller VMs. At 206, the designated controller VM modifies its route tables and firewall rules and causes other controller VMs to modify their route tables and firewall rules to allow communications between nodes of the first subnet. This is to facilitate intra-subnet communications. At 208, the designated controller VM queries a second cluster (e.g., Cluster B in FIG. 1) to obtain a software version used by the second cluster. At 210, the designated controller VM compares the software version used by the second cluster with a software version used by the first cluster to determine whether they are compatible. If the software version used by the second cluster is not compatible with the software version used by the first cluster (No at 210), at 212 the designated controller VM aborts the pairing operation and records an error message in a log/inventory. If the designated controller VM determines that the two software versions are compatible (Yes at 210), at 214 the designated controller VM receives information related to the second/peer subnet for replication in the second cluster. The information related to the second subnet for replication includes one or more of a cluster name of the second cluster, an identifier of the second cluster, an identifier of a gateway of the second subnet, a replication cluster IP address of the second subnet, or other network parameters necessary for pairing operations.

At 216, the designated controller VM determines whether the information related to the second subnet (e.g., subnet 142 in FIG. 1) for replication is different from information related to the first subnet (e.g., subnet 122) for replication. If the information related to the second subnet for replication has no difference from information related to the first subnet for replication (No at 216), the designated controller VM determines that it is performing self-pairing and at 212 aborts the pairing operation. If the information related to the second subnet for replication is different from information related to the first subnet for replication (Yes at 216), at 218 the designated controller VM configures the first subnet with the information related to the second subnet. At 220, the designated controller VM generates a dedicated communication channel for replication between the first cluster and the second cluster based on the configuring. Once the communication channel for replication is generated, at 222 the designated controller VM can communicate information for disaster recovery to the second cluster through the dedicated communication channel so as to provide backup protection for the first cluster.

Because the dedicated communication channel is created for replication, replication traffic routed through the dedicated communication channel would not affect primary I/O traffic within the cluster. Further, a busy node in the cluster does not impact the inter-cluster replication traffic as the primary I/O traffic would not be routed to the replication communication channel. In some embodiments, the dedicated communication channel for replication is configured to provide a mechanism to set properties of the channel, such as quality of service (QoS), bandwidth, security, etc. In one embodiment, properties of the dedicated communication channel are modifiable without affecting primary data I/O within each cluster, nor interfering management/control traffic within the cluster.

In some embodiments, before the pairing started, the designated controller VM may acquire system credentials and cluster management parameters of the peer/second cluster for creating an authenticated client for cluster pairing operations. In one embodiment, the designated controller VM may generate a unique cluster pair ID for the pairing between the first cluster and the second cluster. Further, the designated controller VM logs results and parameters of partial or all of the above operations in a workflow log/inventory. This allows the designated controller VM to resume a pairing operation from where it was interrupted.

Figure 3:
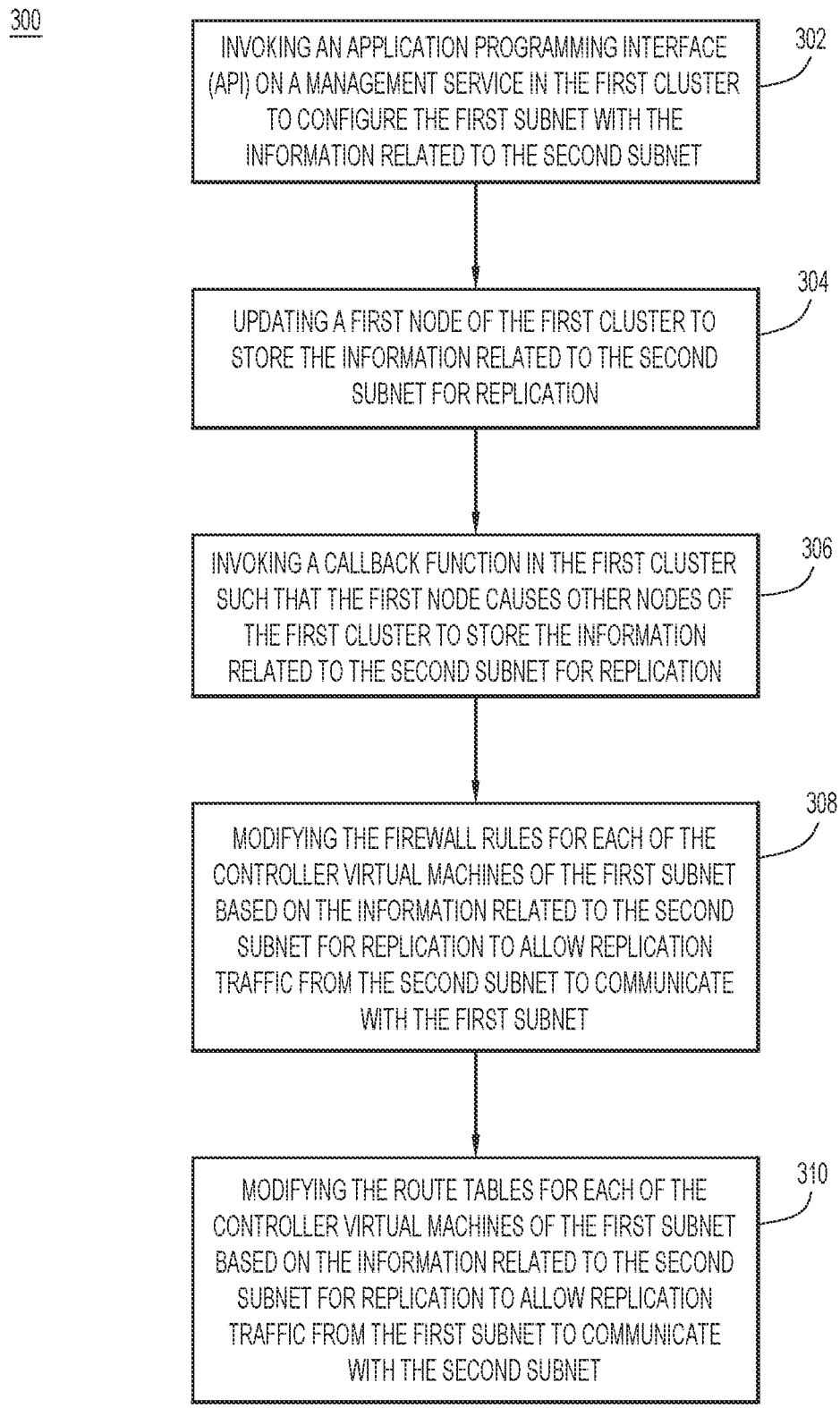
FIG. 3 is a flow chart illustrating a method for configuring a first subnet in a first cluster with information related to a second subnet in a second cluster to pair nodes in the first subnet with nodes of the second subnet, according to an example embodiment.

FIG. 3 is a flow chart illustrating a method 300 for configuring a first subnet with information related to a second subnet to pair nodes in the first subnet with nodes of the second subnet, according to an example embodiment. The method 300 is illustrated as being performed by a controller VM of the first subnet. At 302, the controller VM invokes an application programming interface (API) on a management service in the first cluster to configure the first subnet with the information related to the second subnet. At 304, the controller VM updates a first node of the first cluster to store the information related to the second subnet for replication. In one embodiment, the first node is the host/server that hosts the controller VM. At 306, the controller VM invokes a callback function in the first cluster such that the first node causes other nodes of the first cluster to store the information related to the second subnet for replication. At 308, after the information related to the second subnet for replication has been stored in each of the nodes in the first cluster, the controller VM is configured to modify the firewall rules for each of the controller VMs of the first subnet based on the information related to the second subnet for replication to allow replication traffic from the second subnet to communicate with the first subnet. At 310, the controller VM is configured to modify the route tables for each of the controller VMs of the first subnet based on the information related to the second subnet for replication to allow replication traffic from the first subnet to communicate with the second subnet.

A method similar to the method 300 is also performed by a controller VM of the second subnet for configuring the second subnet with information related to the first subnet to pair nodes in the second subnet with nodes of the first subnet.

Example Cluster Unpairing Protocol

The unpair protocol is very similar to the example pairing protocol explained above. A different workflow inventory is prepared for unpairing two paired clusters. In one example, the API that unpairs a cluster and its peer works in a similar way as described above, relying on Zookeeper and the function associated with the callback to perform inverse of the pairing operations above, including deleting a firewall rule that allows traffic from the peer cluster's replication subnet into the host cluster's replication network and deleting entries in the controller VMs cluster's route tables for routing traffic to the peer cluster's replication network.

Figure 4:
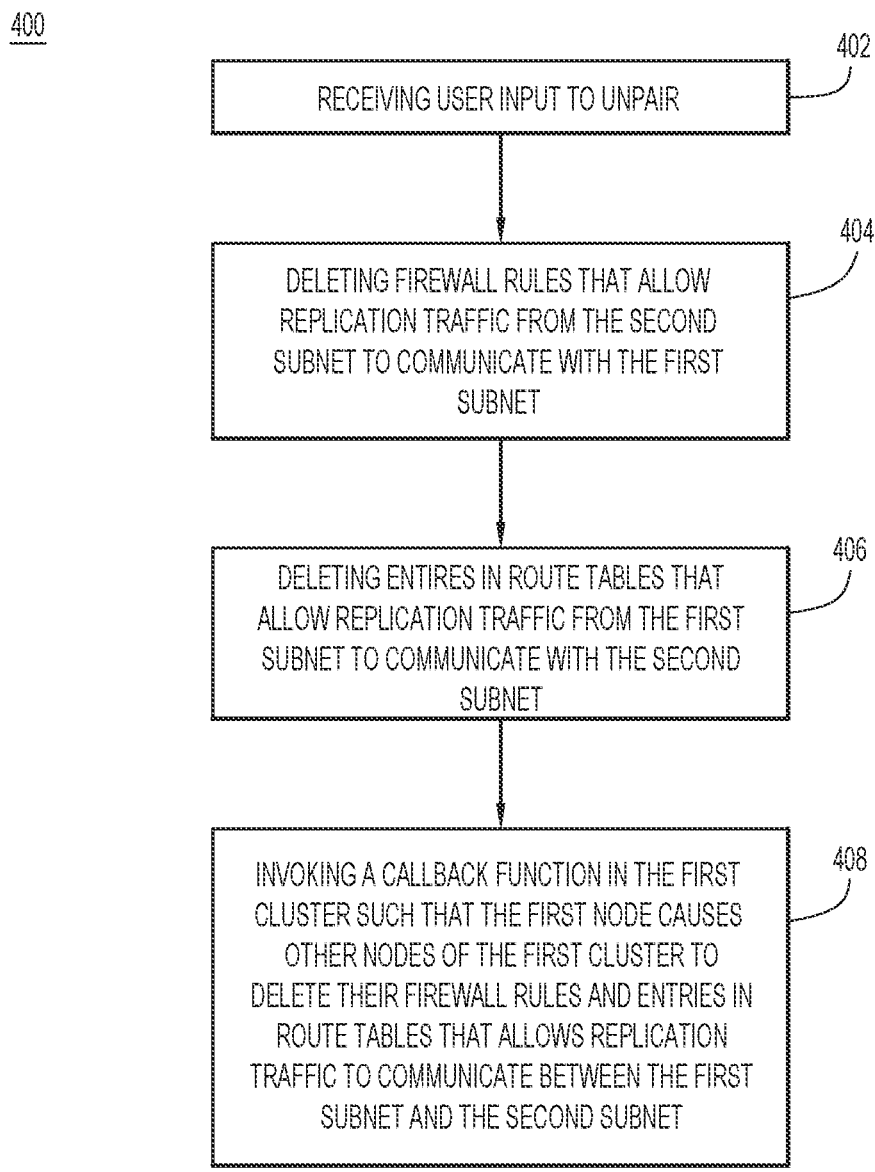
FIG. 4 is a flow chart illustrating a method for unpairing nodes in the first subnet from nodes of the second subnet, according to an example embodiment.

FIG. 4 is a flow chart illustrating a method 400 for unpairing nodes in the first subnet from nodes in the second subnet, according to an example embodiment. The method 400 can be performed by a controller VM of the first subnet. At 402, the controller VM receives user input to remove the pairing with the second subnet. At 404, the controller VM deletes its firewall rules that allow replication traffic from the second subnet to communicate with the first subnet. At 406, the controller VM deletes entries in its route tables that allow replication traffic from the first subnet to communicate with the second subnet. At 408, the controller VM invokes a callback function in the first cluster such that a node that hosts the controller VM causes other nodes of the first cluster to delete their firewall rules and entries in route tables that allows replication traffic to communicate between the first subnet and the second subnet. A method similar to the method 400 is also performed by a controller VM of the second subnet for unpairing the nodes in the second subnet from the nodes of the first subnet.

Example Forget Pairing Protocol

When one of the clusters is unavailable and not reachable from the other cluster, such as in a disaster, the other cluster is used to bring up the workloads to forget the pairing at the impacted cluster. The disaster recovery workflows used to bring up workloads may need to disassociate the pairing information. Unlike cluster pairing and cluster unpairing transactions, which are two-cluster distributed transactions, the "forget" pairing transaction is a single cluster transaction. This workflow removes pairing configuration on the local cluster.

Figure 5:
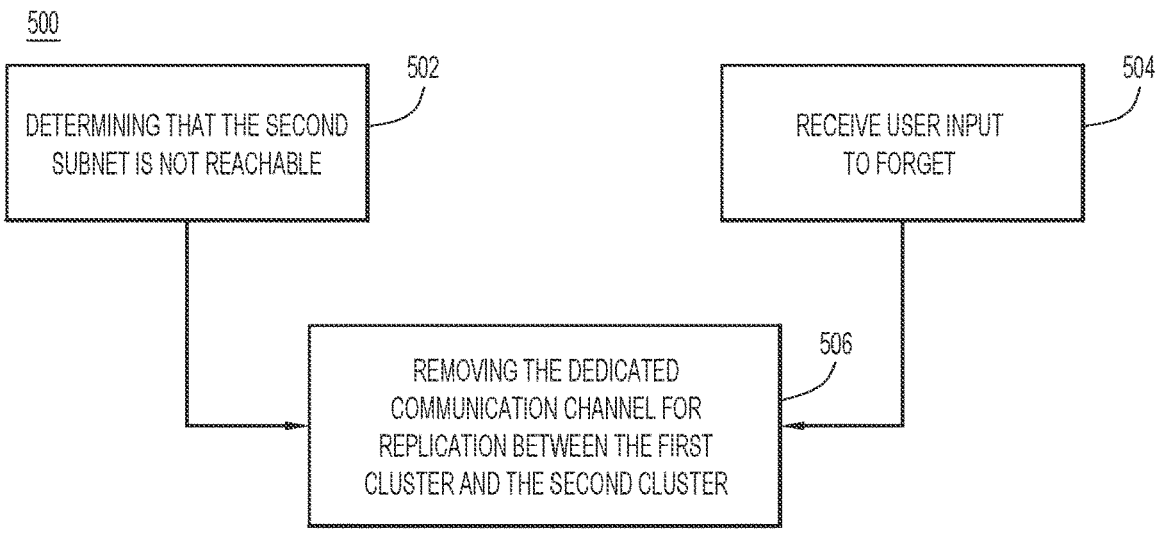
FIG. 5 is a flow chart illustrating a method for a local cluster having a first replication subnet to disassociate pairing configurations with a peer cluster having a second replication subnet, according to an example embodiment.

FIG. 5 is a flow chart illustrating a method 500 for a local cluster having a first replication subnet to disassociate pairing configurations with a peer cluster having a second replication subnet, according to an example embodiment. For example, the method 500 can be performed by a controller VM of the first replication subnet. At 502, the controller VM determines that the second subnet is not reachable. For example, the controller VM is configured to monitor the replication traffic between the first subnet and the second subnet. When the controller VM detects that no reply is received when replication communications are sent to the second subnet or that no replication communications are sent from the second subnet for a predetermined time, the controller VM determines that the second subnet is not reachable. In some embodiments, an administrator of the local cluster may desire disassociation of pairing configurations with a peer cluster. For example, at 504, the controller VM receives user input to remove the pairing with the second subnet. At 506, the controller VM removes the dedicated communication channel for replication between the first cluster and the second cluster. As discussed above, the unpairing operations are performed at the local cluster, but not at the unreachable cluster.

Figure 6:
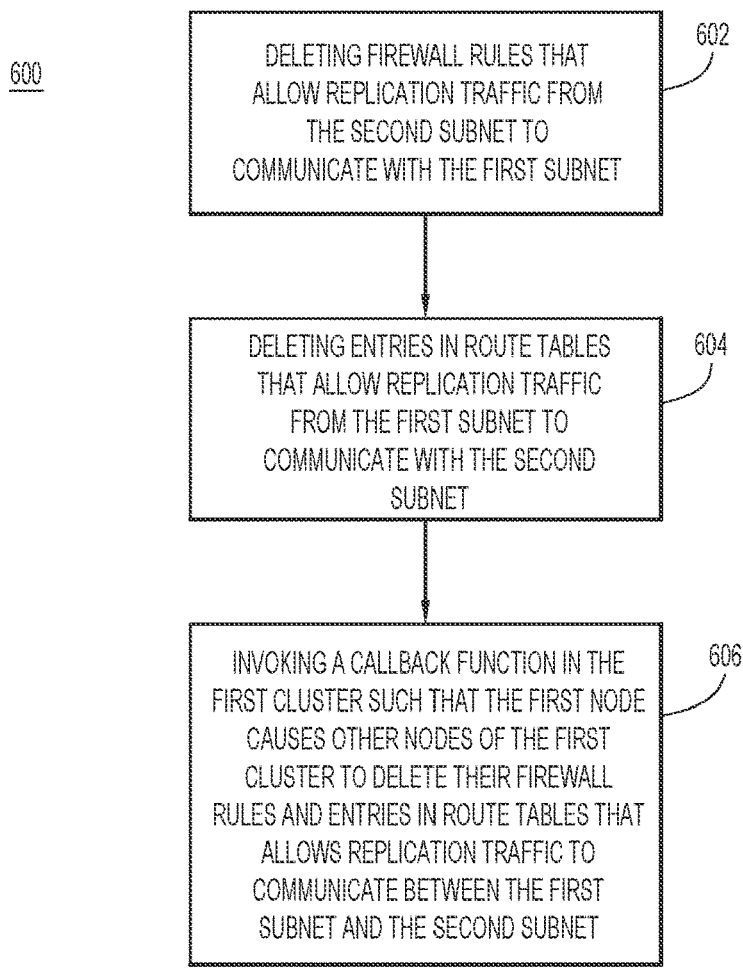
FIG. 6 is a flow chart illustrating a method for removing the dedicated communication channel for replication between the first cluster and the second cluster illustrated in FIG. 5, according to an example embodiment.

FIG. 6 is a flow chart illustrating a method 600 for removing the dedicated communication channel for replication between the first cluster and the second cluster at 504 (FIG. 5), according to an example embodiment. At 602, the controller VM deletes its firewall rules that allow replication traffic from the second subnet to communicate with the first subnet. At 604, the controller VM deletes entries in its route tables that allow replication traffic from the first subnet to communicate with the second subnet. At 606, the controller VM invokes a callback function in the first cluster such that a node that hosts the controller VM causes other nodes of the first cluster to delete their firewall rules and entries in their route tables that allow replication traffic to communicate between the first subnet and the second subnet. After performing forget pairing, the first cluster no longer has pairing configuration with the second subnet in the second cluster, while second cluster still has its pairing configuration with the first subnet in the first cluster until the forget operation is applied to the second subnet.

Example Cluster Pairing Protocol for Backup Protection System

Figure 7:
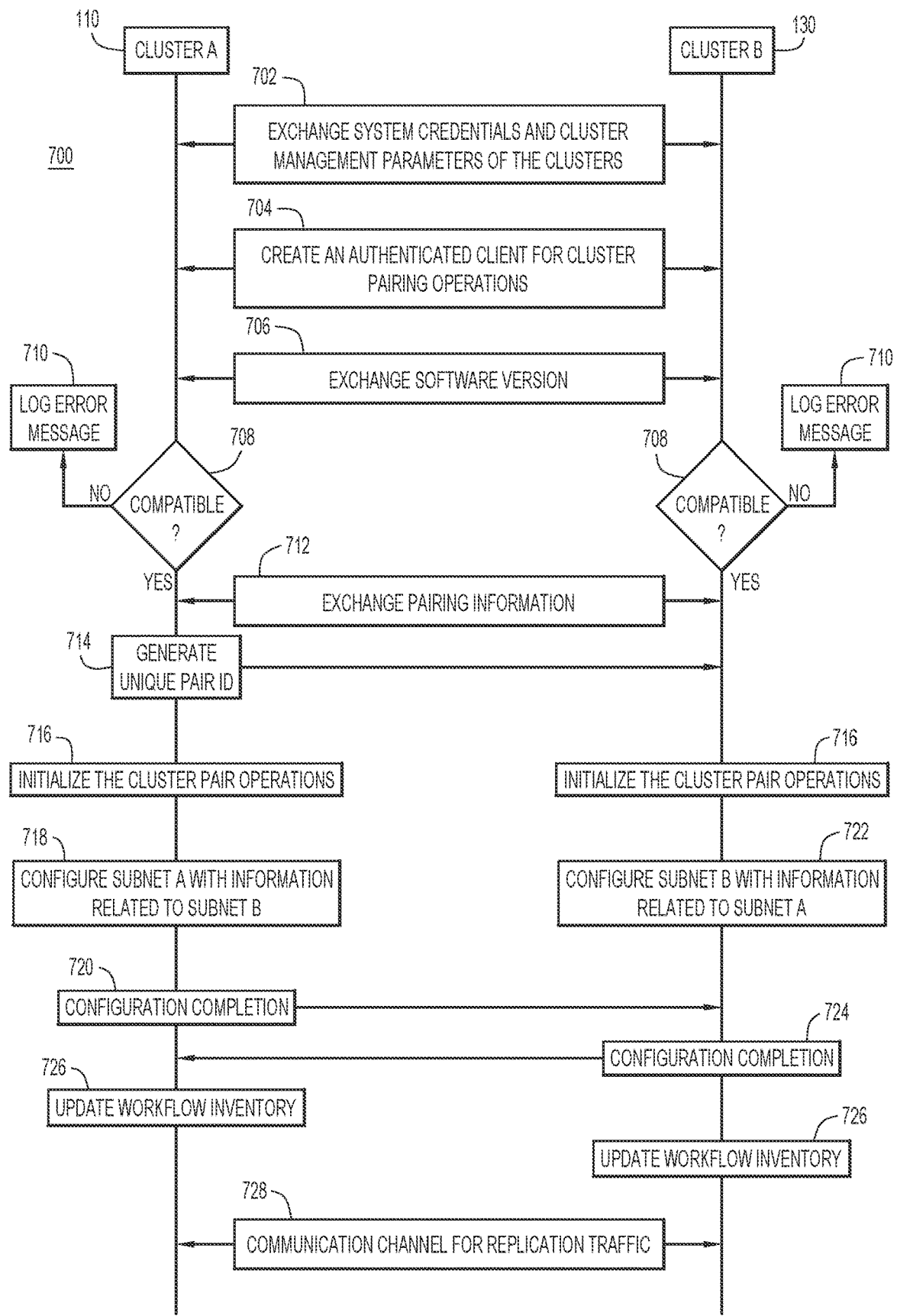
FIG. 7 is a flow chart illustrating a method for generating a communication channel dedicated for replication between two clusters, according to an example embodiment.

Disclosed herein are techniques for providing a backup protection system that includes two computer clusters, such as Clusters A and B in FIG. 1. In one embodiment, the workflow for cluster pairing can be initiated via thrift API, Command-line interface (CLI), ReST API or graphical user interface (UI). Reference is now made to FIG. 7. FIG. 7 is a flow chart illustrating a method 700 for generating a communication channel dedicated for replication between Cluster A (e.g. cluster 110 in FIG. 1) and Cluster B (e.g. cluster 130 in FIG. 1), according to an example embodiment. In the description that follows, for purpose of illustrating the cluster pairing workflow, it is assumed that the operation is initiated at Cluster A, although it can also start with Cluster B. In some embodiments, the pairing workflow may be executed by a controller VM (vNIC) of each cluster.

At 702, system credentials and cluster management parameters of the peer cluster are acquired. That is, the Cluster A acquires system credentials and cluster management parameters of the Cluster B, while the Cluster B acquires system credentials and cluster management parameters of the Cluster A. Based on these data, at 704 an authenticated client for cluster pairing operations is created.

At 706, a controller VM at the Cluster A (controller VM-A) queries Cluster B for its software version. The controller VM-A also queries the local cluster (Cluster A) for software version details. Similarly, a controller VM at the Cluster B (controller VM-B) queries Cluster A for its software version. The controller VM-B also queries the local cluster (Cluster B) for software version details.

At 708, the controller VM-A checks for version compatibility between clusters. If this check passes, the controller VM-A proceeds with the other pairing steps. Otherwise, at 710 the controller VM records appropriate error messages. The controller VM-B also performs similar checking at 708 and recording at 710.

At 712, the controller VM-A queries Cluster B to gather information for pairing, such as a cluster name, a cluster ID, information related to Cluster B's replication network including Cluster B's replication subnet, gateway, and replication Cluster IP. Before this operation, the subnets at the Cluster B (Subnet B) and Cluster A (Subnet A) have been established in a manner similar to those described in 202-206 in FIG. 2. The controller VM-A then validates that the acquired information for pairing do not match that of Cluster A to avoid self-pairing. In one embodiment, the controller VM-A also validates that pairing had not been previously initiated at Cluster B by examining Cluster B's workflow inventory. Similarly, the controller VM-B queries Cluster A to gather information for pairing. The controller VM-B then validates that the acquired information for pairing do not match that of Cluster B to avoid self-pairing. The controller VM-B also validates that pairing had not been previously initiated at Cluster A by examining Cluster A's workflow inventory.

At 714, the controller VM-A generates a unique cluster pair ID. The controller VM-A may share this unique cluster pair ID with the controller VM-B.

At 716, the controller VM-A initializes the cluster pairing operations at Cluster A, in a new workflow inventory at Cluster A. The controller VM-B at the Cluster B may also initialize the cluster pairing operations at Cluster B in a new workflow inventory at Cluster B.

The controller VM-A begins to prepare local cluster for pairing at Cluster A and marks this step in the workflow inventory of Cluster A, with details of the changes to be made. At 718, the controller VM-A configures the Subnet A with the information related to the Subnet B. The controller VM-A modifies local cluster (Cluster A) to support network connectivity with the peer, Cluster B, and modifies firewall rules and route tables on controller VMs of Cluster A based on Cluster B's replication subnet information. The controller VM-A invokes an API on the management service to modify the local cluster. This management API makes an update in a Zookeeper node to store the pairing information. The Zookeeper update triggers a callback function in all controller VMs that are part of the Zookeeper cluster. For example, the controller VM-A modifies its firewall rules based on the information related to the Subnet B for replication to allow replication traffic from the Subnet B to communicate with the Subnet A, and modifies its route tables based on the information related to the Subnet B for replication to allow replication traffic from the Subnet A to communicate with the Subnet B. The controller VM-A invokes a callback function in the Cluster A such that the controller VM-A causes other nodes of the Cluster A to store the information related to the Subnet B for replication. Each of the controller VMs creates a firewall rule that allows traffic from the peer cluster's replication subnet into the host cluster's replication network and creates entries in the controller VMs cluster's route tables to route traffic to the peer cluster's replication network.

At 720, the controller VM-A marks completion of local cluster changes at Cluster A by adding a step in the workflow inventory of Cluster A.

The workflow begins to prepare peer cluster for pairing at Cluster B. The controller VM-A logs a step in the workflow inventory of Cluster A to indicate this operation, and the controller VM-B adds a step in the workflow inventory of Cluster B to indicate this operation. At 722, the controller VM-B modifies local cluster to support network connectivity with the peer, Cluster A, and modifies firewall rules and route tables on controller VMs of Cluster B. At Cluster A, the controller VM-A gathers pairing information of Cluster A from the inventory. The controller VM-B invokes an API on the management service of Cluster B to modify the local cluster. This management API makes an update in a Zookeeper node of Cluster B to store the pairing information. The Zookeeper update triggers a callback function in all controller VMs that are part of the Zookeeper cluster. Each of the controller VMs creates a firewall rule that allows traffic from the Cluster A's replication subnet (Subnet A) into the Cluster B's replication network (Subnet B) and modifies route tables to route replication traffic to the Cluster A's replication network.

At 724, the controller VM-B marks completion of cluster changes at Cluster B and informs the controller VM-A of the completion for adding a record at Cluster A's workflow inventory.

At 726, each of the controllers VM-A and VM-B updates its workflow inventory. For example, the controller VM-A at Cluster A begins completion of pairing at the peer, by adding a record at Cluster A's workflow inventory. The controller VM-B at Cluster B marks completion of pairing at the peer, by adding a record in Cluster B's workflow inventory. The controller VM-A marks completion of pairing at the peer, by adding a record in Cluster A's workflow inventory. The controller VM-A marks completion of pairing at local, by adding a record in Cluster A's workflow inventory. The controller VM-B updates a paired flag of cluster pair at Cluster B, in Cluster B's workflow inventory. The controller VM-A updates paired flag of cluster pair at Cluster A, in Cluster A's workflow inventory.

At 728, pairing of nodes in Cluster A and Cluster B is complete, and a communication channel for replication is created for traffic between the Cluster A and Cluster B. This pairing is marked on inventory configuration. At this point the clusters are considered paired. Query of inventory configuration would show this pairing. Information for disaster recovery is communicated to the peer cluster through the dedicated communication channel to provide backup protection for each local cluster. For example, a router (e.g., router 112 or 132 in FIG. 1) at each cluster is configured to allow communications between the replication subnets.

Figure 8:
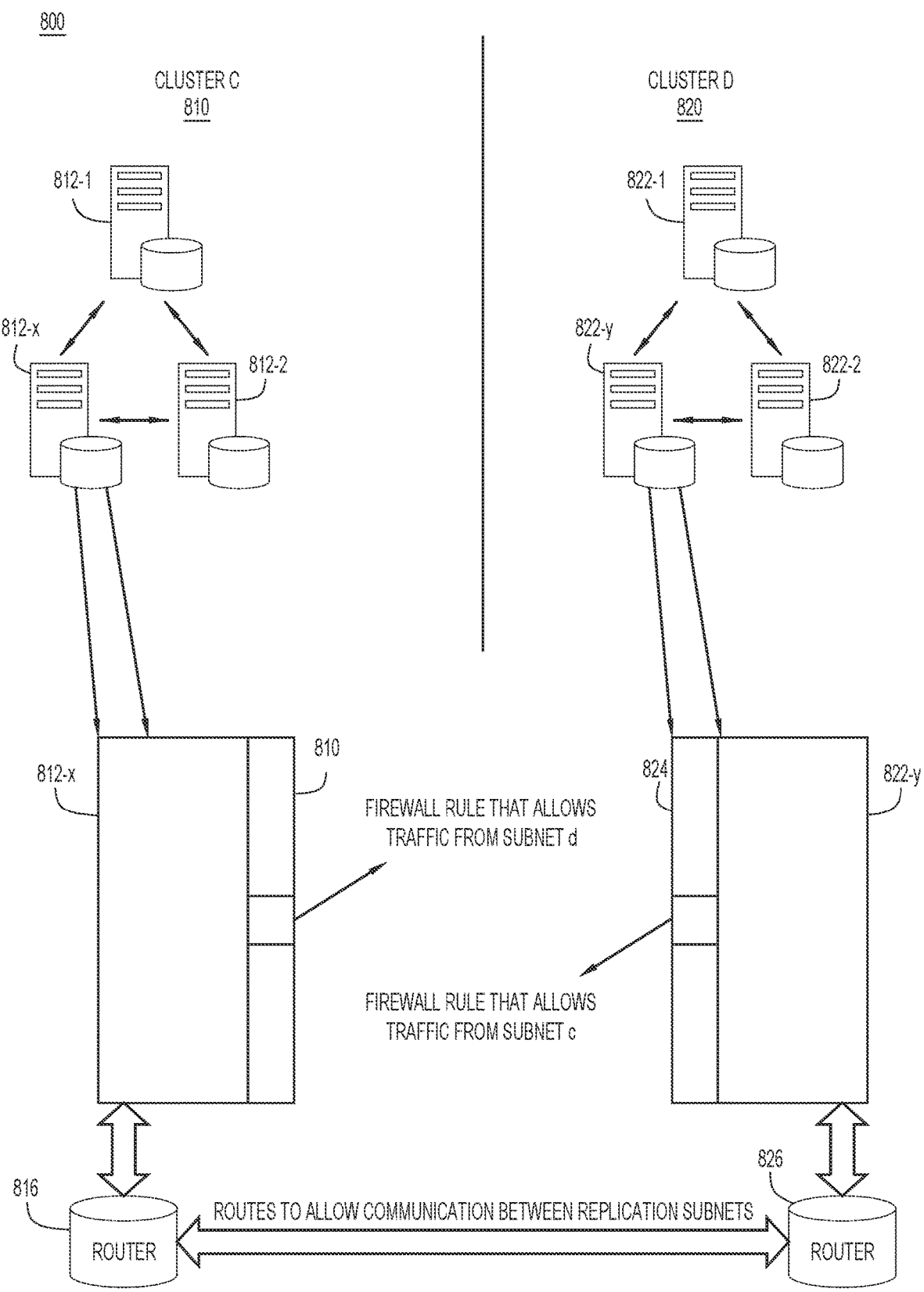
FIG. 8 depicts a schematic diagram of a replication system, according to an example embodiment.

FIG. 8 depicts a schematic diagram of a replication system 800, according to an example embodiment. The replication system 800 includes a Cluster C 810 and a Cluster D 820. The Cluster C includes a computer cluster 812 that include hosts/servers 812-1 to 812-x. The Cluster D includes a computer cluster 822 that include hosts/servers 822-1 to 822-y. Each of the hosts may host a number of VMs that includes a controller VM for controlling pairing operations with a peer cluster. For example, as shown in FIG. 8, host 812-x in the Cluster C hosts a controller VM-C(814), and host 822-y in the Cluster D hosts a controller VM-D (824). The controller VM-C is configured to establish a subnet c among the VMs of the Cluster C, while controller VM-D is configured to establish a subnet d among the VMs of the Cluster D. To pair the nodes in the subnet c with the nodes in the subnet d, the controller VM-C modifies firewall rules to allow traffic from subnet d and modifies route tables to route traffic from subnet c to subnet d. Similarly, the controller VM-D modifies firewall rules to allow traffic from subnet c and modifies route tables to route traffic from subnet d to subnet c. A communication channel is generated between a router 816 at the Cluster C and a router 826 at the Cluster D to allow replication traffic between replication subnets.

Figure 9:
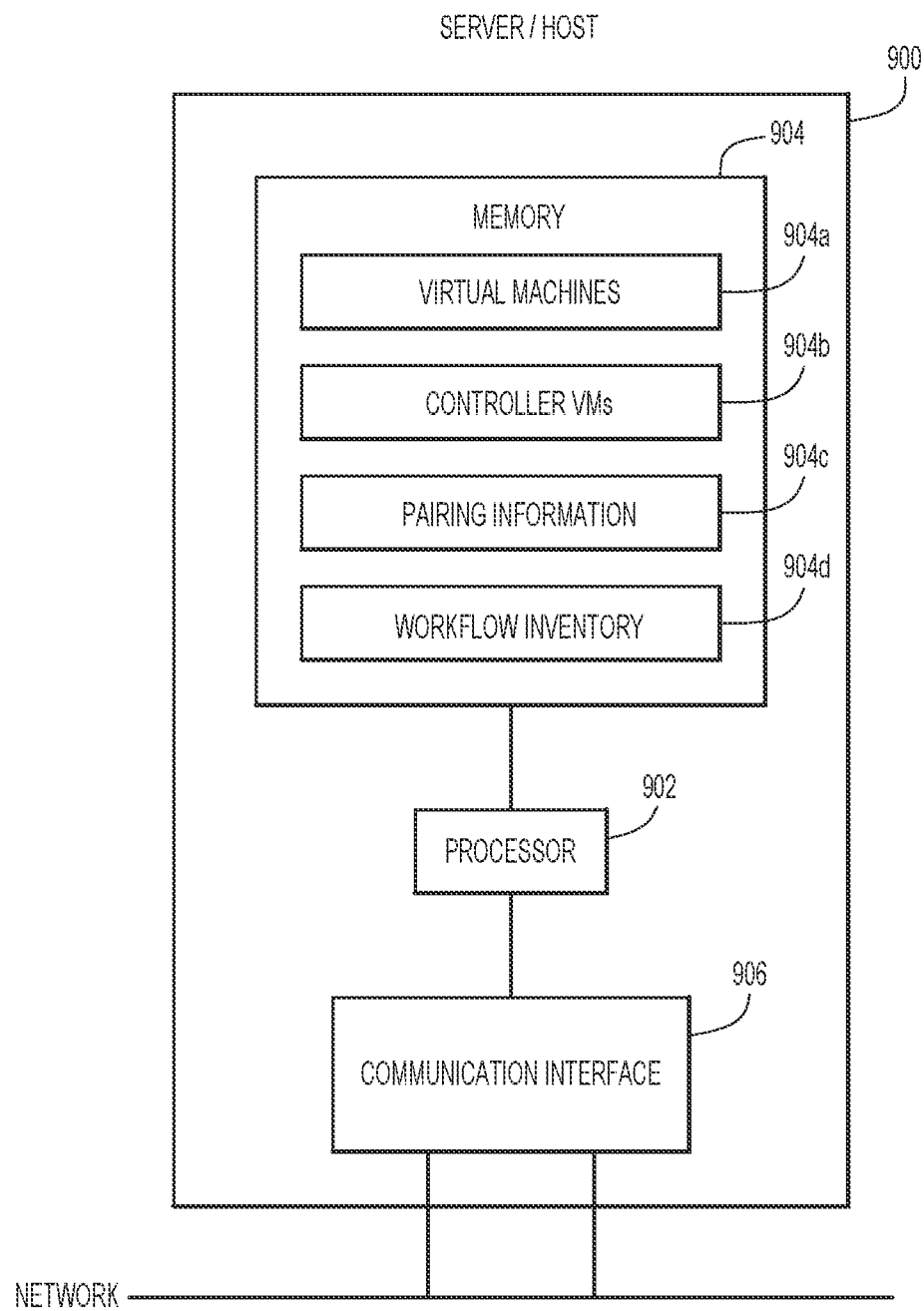
FIG. 9 is a block diagram of a server/host configured to participate in the techniques presented herein, according to an example embodiment.

FIG. 9 depicts a block diagram of a server/host 900 to participate in the mechanisms disclosed herein. The server/host 900 can be any of the server/host 114-1 . . . 114-m and 134-1 . . . 134-n in FIG. 1 and server/host 812-1-1 . . . 812-x and 822-1 . . . 822-y in FIG. 8. The server/host 900 includes a processor 902, a memory 904, and a communication interface 906. The processor 902 may be a microprocessor or microcontroller (or multiple instances of such components) that is configured to execute program logic instructions (i.e., software) for carrying out various operations and tasks described herein. For example, the processor 902 is configured to execute instructions stored in the memory 904 for performing pairing operations as explained above.

The memory 904 may include ROM, RAM, magnetic disk storage media devices, optical storage media devices, flash memory devices, electrical, optical or other physical/tangible memory storage devices. The memory 904 stores various virtual machines 904a, controller VMs 904b including vNIC, pairing information 904c, workflow inventory 904d, etc.

The functions of the processor 902 may be implemented by logic encoded in one or more tangible (non-transitory) computer-readable storage media (e.g., embedded logic such as an application specific integrated circuit, digital signal processor instructions, software that is executed by a processor, etc.), wherein the memory 904 stores data used for the operations described herein and stores software or processor executable instructions that are executed to carry out the operations described herein.

In one embodiment, the processor 902 may be embodied by digital logic gates in a fixed or programmable digital logic integrated circuit, which digital logic gates are configured to perform the pairing software (controller VM 904b). In general, the pairing software may be embodied in one or more computer-readable storage media encoded with software comprising computer executable instructions and when the software is executed operable to perform the operations described herein.

The communication interface 906 is configured to transmit communications to, and receive communications from, the network for the server/host 900. In one example, the communication interface 906 may take the form of one or more network interface cards.

In one embodiment, once cluster pairing is successful, disaster recovery communications between clusters need not use any credentials. The Administrator can choose to use a VPN or other mechanism to secure the link between clusters. Disaster recovery network configuration for new nodes is automatically handled for either cluster, during cluster expansion. The distinct and isolated communication channel allows for modifying bandwidth and other QoS properties from either the fabric interconnect or switch/router by associating properties with the VLAN. In one embodiment, the channel is created without stretching VLAN between clusters, yet have all the desired functionality. A floating IP (ReplCIP) is associated with each cluster, which would not be possible in a pure stretch-VLAN approach. Although the mechanisms uses a one cluster to a peer's cluster topology, they are extensible and applicable to other topologies such as One-to-Many, Many-to-one, Many-to-Many topologies.

To summarize, presented herein are mechanisms for pairing clusters, unpairing clusters, and forgetting a peer cluster. Secure and robust cluster pairing is provided for a successful disaster recover. Business continuity can be deployed using the replication disaster recovery technology. This pairing is configured for proper mapping of replication resources, dynamic firewall configuration, many-to-many node communication, authentication, failure handling, and replication traffic. The techniques provide a pairing that can be safely and quickly configured between clusters, and destroyed as needed by system administrators using the UI, CLI, or API.

In summary, in one aspect, a method is disclosed that includes: establishing a first subnet for replication in a first cluster that includes a plurality of host devices, each of the host devices including a respective controller virtual machine, which together form a virtual local area network for replication, each of the controller virtual machines being assigned an Ethernet interface; assigning a replication Internet Protocol address to each of the Ethernet interfaces of the controller virtual machines; modifying route tables and firewall rules of the controller virtual machines to allow communications between nodes of the first subnet; receiving information related to a second subnet for replication in a second cluster; configuring the first subnet with the information related to the second subnet; generating a dedicated communication channel for replication between the first cluster and the second cluster based on the configuring; and communicating information for disaster recovery to the second cluster through the dedicated communication channel so as to provide backup protection for the first cluster.

In another aspect, an apparatus is disclosed. The apparatus includes a communication interface that enables network communications, a processor, and a memory storing data and instructions executable by the processor. The processor is configured to execute the instructions to: establish a first subnet for replication in a first cluster that includes a plurality of host devices, each of the host devices including a respective controller virtual machine, which together form a virtual local area network for replication, each of the controller virtual machines being assigned an Ethernet interface; assign a replication Internet Protocol address to each of the Ethernet interfaces of the controller virtual machines; modify route tables and firewall rules of the controller virtual machines to allow communications between nodes of the first subnet; receive information related to a second subnet for replication in a second cluster; configure the first subnet with the information related to the second subnet; generate a dedicated communication channel for replication between the first cluster and the second cluster based on the configuring; and communicate information for disaster recovery to the second cluster through the dedicated communication channel so as to provide backup protection for the first cluster.

In yet another aspect, a non-transitory computer-readable storage medium is disclosed, which is encoded with software comprising computer executable instructions which, when executed by a processor of a node in a first computer cluster, cause the processor to: establish a first subnet for replication in a first cluster that includes a plurality of host devices, each of the host devices including a respective controller virtual machine, which together form a virtual local area network for replication, each of the controller virtual machines being assigned an Ethernet interface; assign a replication Internet Protocol address to each of the Ethernet interfaces of the controller virtual machines; modify route tables and firewall rules of the controller virtual machines to allow communications between nodes of the first subnet; receive information related to a second subnet for replication in a second cluster; configure the first subnet with the information related to the second subnet; generate a dedicated communication channel for replication between the first cluster and the second cluster based on the configuring; and communicate information for disaster recovery to the second cluster through the dedicated communication channel so as to provide backup protection for the first cluster.

The above description is intended by way of example only. The present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Although the techniques are illustrated and described herein as embodied in one or more specific examples, it is nevertheless not intended to be limited to the details shown, since various modifications and structural changes may be made within the scope and range of equivalents of this disclosure.

What is claimed is:

1. A method comprising:
   establishing a first subnet, via a fabric interconnect, for replication in a first cluster that includes a plurality of host devices, each of the host devices including a respective controller virtual machine, which together form a virtual local area network for replication, each of the controller virtual machines being assigned an Ethernet interface;
   assigning a respective replication Internet Protocol (IP) address to the Ethernet interface of each of the controller virtual machines;
   modifying route tables and firewall rules of the controller virtual machines to allow communications between nodes of the first subnet;
   designating a virtual network interface card of the fabric interconnect in the first cluster to control replication operations with a second cluster, and assigning to the virtual network interface card of the fabric interconnect a replication cluster IP address;
   receiving, by the virtual network interface card of the fabric interconnect, via the replication cluster IP address, information related to a second subnet for replication in a second cluster;
   determining whether the second subnet and the first subnet are engaged in a self-pairing operation;
   in response to determining that the second subnet and the first subnet are not engaged in a self-pairing operation, configuring the first subnet with the information related to the second subnet to pair the first cluster with the second cluster;
   generating a dedicated communication channel for replication between the first cluster and the second cluster based on the configuring;
   communicating information for disaster recovery to the second cluster through the dedicated communication channel so as to provide backup protection for the first cluster, determining that the second subnet is not reachable for a predetermined amount of time; and removing the dedicated communication channel for replication between the first cluster and the second cluster by un-pairing the first cluster from the second cluster, wherein the un-pairing is performed at the first cluster, but not at the second cluster, which is not reachable.

2. The method of claim 1, further comprising:

querying the second cluster to obtain a software version used by the second cluster; and comparing the software version used by the second cluster with a software version used by the first cluster to determine compatibility.

3. The method of claim 1, wherein the information related to the second subnet for replication includes one or more of a cluster name of the second cluster, an identifier of the second cluster, an identifier of a gateway of the second subnet, or a replication cluster IP address of the second subnet, wherein the method further comprises:

determining whether the second subnet and the first subnet are engaged in a self-pairing operation by determining whether the information related to the second subnet for replication is different from information related to the first subnet for replication.

4. The method of claim 1, further comprising:

invoking an application programming interface (API) on a management service in the first cluster to configure the first subnet with the information related to the second subnet.

5. The method of claim 4, further comprising:

updating a first node of the first cluster to store the information related to the second subnet for replication; and invoking a callback function in the first cluster such that the first node causes other nodes of the first cluster to store the information related to the second subnet for replication.

6. The method of claim 5, further comprising:

modifying the firewall rules for each of the controller virtual machines of the first subnet based on the information related to the second subnet for replication to allow replication traffic from the second subnet to communicate with the first subnet; and modifying the route tables for each of the controller virtual machines of the first subnet based on the information related to the second subnet for replication to allow replication traffic from the first subnet to communicate with the second subnet.

7. An apparatus, comprising:

a communication interface that enables network communications;

a processor; and a memory storing data and instructions executable by the processor, wherein the processor is configured to execute the instructions to:

establish a first subnet, via a fabric interconnect, for replication in a first cluster that includes a plurality of host devices, each of the host devices including a respective controller virtual machine, which together form a virtual local area network for replication, each of the controller virtual machines being assigned an Ethernet interface;

assign a respective replication Internet Protocol (IP) address to the Ethernet interface of each of the controller virtual machines;

modify route tables and firewall rules of the controller virtual machines to allow communications between nodes of the first subnet;

designate a virtual network interface card of the fabric interconnect in the first cluster to control replication operations with a second cluster, and assign to the virtual network interface card of the fabric interconnect a replication cluster IP address;

receive, by the virtual network interface card of the fabric interconnect, via the replication cluster IP address, information related to a second subnet for replication in a second cluster;

determine whether the second subnet and the first subnet are engaged in a self-pairing operation;

in response to determining that the second subnet and the first subnet are not engaged in a self-pairing operation, configure the first subnet with the information related to the second subnet to pair the first cluster with the second cluster;

generate a dedicated communication channel for replication between the first cluster and the second cluster based on the configuring;

communicate information for disaster recovery to the second cluster through the dedicated communication channel so as to provide backup protection for the first cluster;

determine that the second subnet is not reachable for a predetermined amount of time; and remove the dedicated communication channel for replication between the first cluster and the second cluster by un-pairing the first cluster from the second cluster, wherein the un-pairing is performed at the first cluster, but not at the second cluster, which is not reachable.

8. The apparatus of claim 7, wherein the processor is further configured to:

query the second cluster to obtain a software version used by the second cluster; and compare the software version used by the second cluster with a software version used by the first cluster to determine compatibility.

9. The apparatus of claim 7, wherein the information related to the second subnet for replication includes one or more of a cluster name of the second cluster, an identifier of the second cluster, an identifier of a gateway of the second subnet, or a replication cluster IP address of the second subnet, wherein the processor is further configured to:

determine whether the second subnet and the first subnet are engaged in a self-pairing operation by determining whether the information related to the second subnet for replication is different from information related to the first subnet for replication.

10. The apparatus of claim 7, wherein the processor is further configured to:

invoke an application programming interface (API) on a management service in the first cluster to configure the first subnet with the information related to the second subnet.

11. The apparatus of claim 10, wherein the processor is further configured to:

update a first node of the first cluster to store the information related to the second subnet for replication; and invoke a callback function in the first cluster such that the first node causes other nodes of the first cluster to store the information related to the second subnet for replication.

12. The apparatus of claim 7, wherein the processor is further configured to:

modify the firewall rules for each of the controller virtual machines of the first subnet based on the information related to the second subnet for replication to allow replication traffic from the second subnet to communicate with the first subnet; and modify the route tables for each of the controller virtual machines of the first subnet based on the information related to the second subnet for replication to allow replication traffic from the first subnet to communicate with the second subnet.

13. A non-transitory computer-readable storage medium encoded with software comprising computer executable instructions which, when executed by a processor of a node in a first computer cluster, cause the processor to:

establish a first subnet, via a fabric interconnect, for replication in a first cluster that includes a plurality of host devices, each of the host devices including a respective controller virtual machine, which together form a virtual local area network for replication, each of the controller virtual machines being assigned an Ethernet interface;

assign a respective replication Internet Protocol (IP) address to the Ethernet interface of each of the controller virtual machines;

modify route tables and firewall rules of the controller virtual machines to allow communications between nodes of the first subnet;

designate a virtual network interface card of the fabric interconnect in the first cluster to control replication operations with a second cluster, and assign to the virtual network interface card of the fabric interconnect a replication cluster IP address;

receive, by the virtual network interface card of the fabric interconnect, via the replication cluster IP address, information related to a second subnet for replication in a second cluster;

determine whether the second subnet and the first subnet are engaged in a self-pairing operation;

in response to determining that the second subnet and the first subnet are not engaged in a self-pairing operation, configure the first subnet with the information related to the second subnet to pair the first subnet with the second subnet;

generate a dedicated communication channel for replication between the first cluster and the second cluster based on the configuring;

communicate information for disaster recovery to the second cluster through the dedicated communication channel so as to provide backup protection for the first cluster;

determine that the second subnet is not reachable for a predetermined amount of time; and remove the dedicated communication channel for replication between the first cluster and the second cluster by un-pairing the first cluster from the second cluster, wherein the un-pairing is performed at the first cluster, but not at the second cluster, which is not reachable.

14. The non-transitory computer-readable storage medium of claim 13, wherein the instructions further cause the processor to:

query the second cluster to obtain a software version used by the second cluster; and compare the software version used by the second cluster with a software version used by the first cluster to determine compatibility.

15. The non-transitory computer-readable storage medium of claim 13, wherein the information related to the second subnet for replication includes one or more of a cluster name of the second cluster, an identifier of the second cluster, an identifier of a gateway of the second subnet, or a replication cluster IP address of the second subnet, wherein the instructions further cause the processor to:

determine whether the second subnet and the first subnet are engaged in a self-pairing operation by determining whether the information related to the second subnet for replication is different from information related to the first subnet for replication.

16. The non-transitory computer-readable storage medium of claim 13, wherein the instructions further cause the processor to:

invoke an application programming interface (API) on a management service in the first cluster to configure the first subnet with the information related to the second subnet.

17. The non-transitory computer-readable storage medium of claim 16, wherein the instructions further cause the processor to:

update a first node of the first cluster to store the information related to the second subnet for replication; and invoke a callback function in the first cluster such that the first node causes other nodes of the first cluster to store the information related to the second subnet for replication.

18. The non-transitory computer-readable storage medium of claim 13, wherein the instructions further cause the processor to:

modify the firewall rules for each of the controller virtual machines of the first subnet based on the information related to the second subnet for replication to allow replication traffic from the second subnet to communicate with the first subnet; and modify the route tables for each of the controller virtual machines of the first subnet based on the information related to the second subnet for replication to allow replication traffic from the first subnet to communicate with the second subnet.

\* \* \* \* \*